Aug. 15, 1972   J. D. WORRALL   3,684,545
THERMOSETTING DRY TRANSFER
Filed Nov. 7, 1969
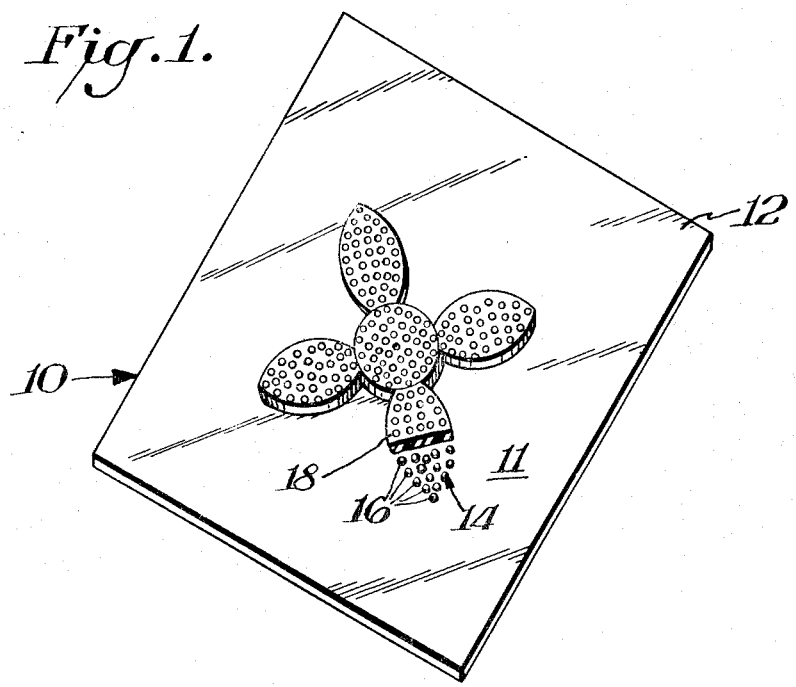
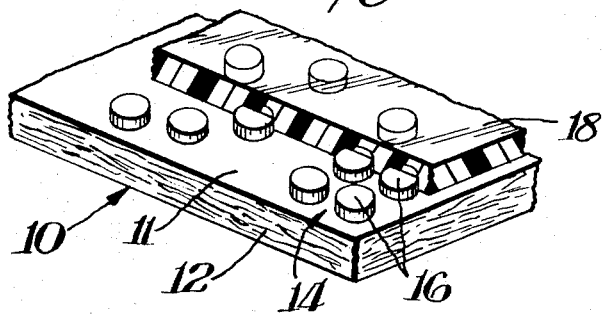
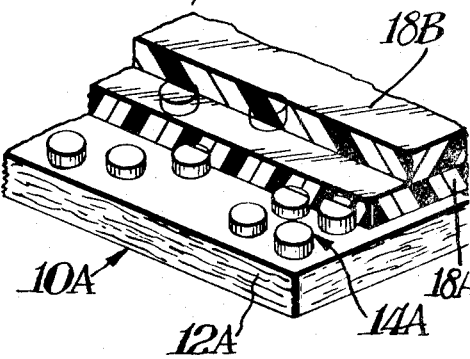
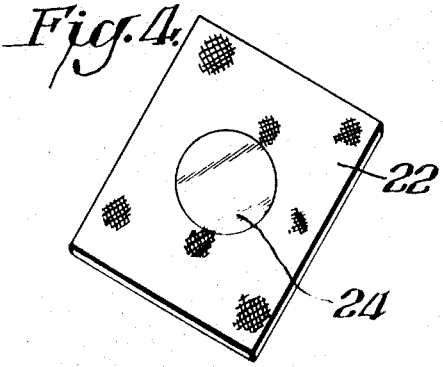
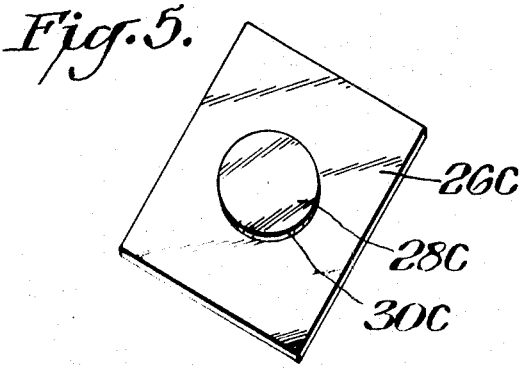

United States Patent Office 3,684,545
Patented Aug. 15, 1972

3,684,545
THERMOSETTING DRY TRANSFER
James D. Worrall, Newark, Del. (Kaumagraph Company, 14th and Poplar St., Wilmington, Del. 19899)
Filed Nov. 7, 1969, Ser. No. 874,906
Int. Cl. C09j 7/02
U.S. Cl. 117—3.4                              19 Claims

ABSTRACT OF THE DISCLOSURE

A colored design is applied upon a high release carrier sheet, such as paper coated with a high release agent. A resin film layer incorporating a combination of a mixture of blocked polyurethane and vinyl copolymer resins is deposited over the colored design on the carrier sheet. The design is transferred and thermally set by application of heat and pressure. The design migrates within and is protected by the heat set resin film. An additional resin layer such as a pigmented thermoplastic plastisol, may be deposited on the transfer over the design-covering layer to provide a suitable background for the design and/or increased transfer characteristics. The resin film layer may comprise a pair of layers with the upper layer being the same as the above identified blocked and substantially uncured single layer resin film and a partially cured resin film layer of similar composition being inserted under it. This composite system permits a design having superior abrasion and heat resistance to be applied to materials with extreme rapidity.

BACKGROUND OF THE INVENTION

(1) Field of the invention

This invention relates to dry transfer sheets for decorating surfaces and more particularly to application of a durable decoration having thermosetting properties for application to various surfaces, such as fabric, rubber, sponge plastic (vinyl and other) and metal.

(2) Description of the prior art

There has been a long-standing need for a dry transfer for durably decorating cloth, rubber, sponge and other such materials. Decorated textile fabrics are, for example, subjected to repeated washing, dry-cleaning and ironing which are likely to damage and remove applied decorations. Existing decorations applied by dry transfers are not as durable as desired. An object of this invention is to provide an economical dry transfer and method of making it for applying a durable design upon common materials, which is durable and resistant to washing, dry-cleaning and ironing. Another object is to provide such a dry transfer which is easy, rapid and dependable to apply.

SUMMARY

In accordance with this invention, a colored design is applied upon a high release carrier sheet. A resin film layer is applied upon the sheet over the design. The resin layer includes a combination of a blocked polyurethane with a vinyl polymer (preferably copolymer) which eliminates the tackiness of the urethane. This facilitates handling and transfer by application of pressure and heat to the back of the carrier sheet. An additional resin layer may be applied over the first design-covering layer to provide a pigmented background for the design or to facilitate transfer. This second layer is, for example, an entirely thermoplastic, plastisol. The time required to apply the transfer and its durability with respect to heat and abrasion is greatly improved by utilizing a two-layer resin film of the composition described above in which the first deposited layer is partially cured before the second substantially uncured layer is applied. Each of the two layers is slightly thinner than the single layer which they replace, but their combination is thicker than the one-layer system, for example, approximately one and one-half times thicker. The design may be multi-colored and has the ability to migrate into the covering resin film during the transfer process to protect it therein.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a pictorial view of a dry transfer which is one embodiment of this invention;

FIG. 2 is an enlarged fragmented view of a portion of the dry transfer shown in FIG. 1;

FIG. 3 is an enlarged fragmented view of a portion of a transfer which is representative of other embodiments of this invention;

FIG. 4 is a pictorial view of a design applied to a piece of cloth from a transfer of this invention as shown in FIGS. 1 and 2; and FIG. 5 is a pictorial view of another design applied to another piece of cloth from a transfer of this invention as shown in FIG. 3.

DESCRIPTION OF THE PREFERRED EMBODIMENTS

In FIG. 1 is shown a composite transfer sheet 10 including a carrier or support sheet 12 having high release properties. Support or base sheet 12 is substantially translucent in order to allow the user to place the design in registry with the object to be decorated. Suitable support sheets are well known in the art and include, inter alia, translucent paper, calendered parchment, onion skin paper, tough tissue paper, and the like. Synthetic plastic film support sheets having a suitably high softening temperature, such as cellulose acetate, and polyethylene terephthalate, etc., having good release properties for the design-covering resin film (later described) while usable are not preferred due to their expense and the problems involved in printing thereon.

Support sheet 12 should have suitable release properties so that during transfer the ink design and covering resin film can be released from the support sheet. The synthetic film supports are generally not preferred due to their relatively high expense, the difficulty in obtaining properly receptive inks, their lack of stiffness requiring them to be backed prior to feeding into printing rolls and their tendency at times to adhere to themselves due to static electricity but are well known in the art and are included within the terms of this invention. Polyethylene terephthalate support sheets, such as sold under Du Pont trademarks, Dacron or Mylar, however, can be used if the formulation of the resin layer is selected to prevent the design-covering film of this invention from sticking to them.

The support sheet usually must be coated or impregnated with a suitable release material so as to facilitate release of the ink design and covering resin film. These coatings are known in the art in general and may be applied by spraying, brushing, impregnating, dipping, casting, doctor-blading, etc. Chemical release coatings per se are well known and include zein, silicones, synthetic organo polymers, Quilon, etc. The silicones are generally organopolysiloxanes such as dimethyl-dichlorosilane, silicon-rubber polymers in solvent, etc. Quilon is the trademark for a stearato-chromic chloride or a Werner-type chromium complex in isopropanol supplied by E. I. du Pont de Nemours & Co., Inc., Wilmington, Del. Synthetic polymers such as cellulose acetate, polyolefins, etc., may be coated or impregnated on the paper if their softening temperatures are high enough and they will not stick to the cured decorative layer. The release coating applied may be any of the materials known generally in the art naturally subject to the proviso that they are sufficiently receptive to the ink design to avoid distortion of the design and to adhere slightly to the ink to prevent premature release. The release coating should be one which will allow release of the subsequently applied film forming resin (later described) in those areas where it contacts the support. The release coating may if desired be in registry with the design although no advantage is derived thereby and commercially available release support coatings are normally produced over the entire support.

A particularly advantageous support sheet of the above nature comprises a Quilon coating on the printed side and a silicone coating on the reverse side. During storage and transportation in a stacked relationship, therefore the use of a slip sheet between each unit is obviated. The individual units are stacked with the decoated side of one unit in contact with the silicone coated support sheet of another unit and no sticking, premature transfer or blocking results. A suitable coating material for this purpose is Syl-off 23, a solution of silicone-rubber polymer in xylene, Dow Corning Corp. After coating, the paper is cured at low temperature to avoid prematurely thermosetting the later described resin layer.

After the release properties have been imparted to support sheet 12, it is printed with an ink design 14. Design 14 comprises a series of discontinuous ink dots 16 which provide design and tonal qualities depending on the density of the dots. Design 14 was, for example, produced by four-color process lithography. Other printing methods can also be used. The four-color process is advantageous because it is the best presently-available method for transferring full process color photographic images to fabrics and similar surfaces. Any of the commercially available lithographic inks may be used, as later described, provided they migrate within the deposited resin film in the later described manner. Final selection depends on the degree of brightness and permanence desired. Certain inks have shown outstanding properties in this regard, particularly those having relatively low surface tension such as FD & C color lakes. Examples of such FD & C color lakes are those made and sold by H. Kohnstamm & Co., Inc., of New York, N.Y.; Chicago, Ill. and Los Angeles, Calif., under the trademark Lakolene.

Such color lakes afford excellent brightness on the Quilon printing surface and possibly provide some physical and/or chemical attraction to the materials in the resin layer that yields superior washability and drycleaning properties. In other words they migrate within the deposited resin film to become enveloped and protected within it without excessive bleed by solvents—thus maintaining an intact printed image. These FD & C color lakes thus become bound to the material upon which they are transferred to an unexpected degree of durability. They are surprisingly more durable in this application than inherently more permanent colorants. Their durability is apparently due to their ability to migrate rapidly and thoroughly through the deposited resin film. Examples of an ink with such FD & C color lakes are those obtainable from Crescent Ink Co., Philadelphia, Pa. The phenolic resin with linseed and tung oils with cobalt drier used in this type of Crescent ink is readily softened by the solvents normally used in the decorative layer which causes the pigment to readily migrate into the applied resin layer and become permanently bound and protected within it. Their ability to migrate may be due to the heavy loading of pigment.

Ink design 14 of the present invention may be produced by conventional printing methods such as offset lithograph, letter press, rotogravure, flexography, screen printing and the like. The earlier stated printing methods quickly and economically provide wide color range, sharp contrast and good tonal control as compared with the later mentioned screen printing. In a single pass through a typical four roll lithographic printer, four primary colors can be printed which by control of tone through dot density and over printing (printing one color upon another, e.g., yellow over blue to give green) can produce an entire complex multicolor design.

Inks commercially available for offset printing may be used in this invention, provided they have the aforementioned migrating ability and campatibility with the covering resin film. Such inks generally contain a suitable pigmenting or coloring material, e.g., titanium dioxide, benzidine yellows, analine dye, cadmium sulfoselenide, cadmium oxide, cobalt oxide, carbon black, manganese dioxide, etc., in a suitable carrier with or without flux, extenders, film forming agents, driers and the like. Heat-bodied linseed oil, rosin oils, mineral oils, or volatile solvents, e.g., xylene may be utilized depending on the printing process. The inks may contain alkyds, phenol-formaldehyde, rosin, coumaroneindene, or other synthetic resins. Cobalt, manganese and lead soaps may be added in suitable cases to achieve rapid drying by oxidation and polymerization. The ink utilized should not in general contain bleeding toners which will bleed through the subsequently applied coating of resin film.

The film forming agents utilized in these printing inks must not be confused with the resin film materials of the present invention. Printing inks are composed in general of pigment plus carrier. If only a dispersing or solvent carrier were used, then upon drying the pigment would immediately flake off the surface printed since nothing would exist to hold it on. Film formers or viscous oil vehicles such as used in these inks are merely designed to afford sufficient binding to avoid flaking but need not provide a coherent mass of ink.

Resin layer 18 includes a resin system that can be cross-linked to some degree with heat, such as a polyvinyl chloride-acetate copolymer and blocked polyurethane mixture. Suitable vinyl compounds are VMCH and VYHH (Union Carbide Corp.). A suitable urethane is Thylon D–406, a one-package blocked urethane system (Thiokol Chemical Corp.). The vinyl and urethane have excellent compatibility and adapt readily to coating and screen printing methods. The urethane cures with heat to form a cross-linked polyurethane. In the manufacture of one version of the transfer, resin layer 18 must be cast on the design configuration and carrier sheet in such a way that it remains thermoplastic until the transfer is applied to the final article. This is done by dissolving the resins in a suitable solvent, such as methyl ethyl ketone or cyclohexanone, screening or coating on the design configuration and carrier sheet, and removing the solvents by drying at a sufficiently low temperature to avoid excessive curing of urethane. Application of the resin coating may be accomplished by screen printing, knife coating, roller coating, gravure printing, or coating or any other suitable coating technique. The uncured, dry urethane is quite tacky and elastomeric and if applied alone to the design configuration and carrier sheet, would make the transfer sheet very difficult to handle. By incorporating the vinyl resin into the system, the resin can be made to dry tack free. This tack free property is particularly important if another pass through the screen press is required. In essence, this system comprises vinyl resin being plasticized by the elastomeric urethane. When subjected to adequate heat, the plasticizer reacts with itself (the urethane) to cross-link the system to yield washability, drycleanability, and ironability.

In FIG. 1 resin film 18 is placed in register over design 14. Film 18 imparts the necessary coherency to the ink film design 14 and the non-coherent and possibly discontinuous ink film design 14 is thus joined by one common film forming mass. Resin film 18 becomes intermingled with the ink so that it becomes an integral part therewith. Film 18 actually contacts release coating 11 on support sheet 12 in those portions of the ink design 14 which have been obtained by dots 16. Release coating 11 is chosen so that it affects release not only of the ink design 14 but also of film forming resin 18 in those areas where they contact.

Film forming resin 18 may be clear, translucent or opaque and may if desired be colored. The particular choice depends on the ultimate effect desired as well as the ultimate material to be decorated. For example, if the decoration is to be applied to glass, an opaque resin film may be desired to give opaqueness to the overall design. On the other hand, if the article to be decorated is itself opaque a clear film layer, colored or colorless, may be utilized since the opaque nature of the articles renders the applied design opaque.

The amount of film forming resin utilized should be sufficient to impart coherency to the ink design, allow its intact transfer and to ultimately protect it. Generally speaking, there is no upper limit to the amount added except practical considerations such as expense, drying, curl, rigidity, etc. Suitable ranges include a coating thickness of from 0.1 to 0.75 mil. A typical useful thickness is 0.4 mil. The preferred method of application is by conventional screening. The resulting resin film 18 surrounds, connects and imparts coherency to ink design 14 in a thin film-forming mass. The design is thus sufficiently connected to release uniformly in its entirety from the support sheet during the transfer operation.

Resin layer 18 is dried by holding it and support sheet 12 and design 14 under it at a temperature about or below 180° F. until the solvent is fully evaporated and it is no longer tacky. It is thus held at a temperature of approximately 180° F. for thirty seconds. The aforementioned assembly could also be held at a temperature of 120° F. for ten minutes. The temperature and time must be great enough to dry the film 18 so that it is no longer tacky. They must not be high and long enough to effect any significant cure of the blocked resin system.

FIG. 3 represents two alternative forms of this invention. In the first alternative form, the resin layer 18 in the above-described form of this invention is replaced by a pair of resin layers 18A and 18B. Layers 18A and 18B are the same in composition as that previously described. Layer 18B is relatively uncured because it is dried under similar conditions as aforementioned layer 18. Layer 18B, however, may be pigmented to provide a color background for the applied transfer. If a pigmented layer were deposited directly on the ink of design configuration 14, the pigments in the two layers would bleed into each other, thus destroying the precision of the design.

Resin layers 18A and 18B are each, for example, from 0.1 mil to 0.4 mil in thickness and usually 0.3 mil thick. Partially cured layer 18A may, however, be slightly thicker, for example 0.1 to 0.75 mil in thickness. First applied layer 18A is partially cured by holding it and release sheet 12 and design 14 over which it is applied at a temperature between 275 and 325° F. for one to three minutes. This partial curing yields a film layer with superior properties of abrasion resistance and heat (ironing) resistance due to its partially thermoset character. Second applied layer 18B is held together with the release sheet and layers therebetween and dried at a temperature about or below 180° F. until the solvent is fully evaporated. The transfer assembly is thus held at approximately 180° F. for thirty seconds or it could be held at temperature of 120° F. for ten minutes. The temperature and time vary for different materials and thicknesses. This composite partially cured and uncured resin film gives the ultimate transfer the ability to be applied by heat and pressure in the relatively short application time of one to three seconds and typically 1.5 seconds, during which the composite layer 18A becomes fully cured and layer 18B becomes sufficiently cured to form a durable bond to the material to which the transfer is applied. Heavier materials utilize the higher range of the aforementioned short application times. The ultimately applied design also has superior abrasion and resistance to heat such as in washing and ironing.

For a second variation of this invention shown in FIG. 3, an outer resin layer 18B of different composition is deposited upon the vinyl-urethane design-covering layer 18A which is identical to layer 18. The purpose of outer layer 18B of different composition is to provide a colored background for the applied transfer, or to provide different conditions of application, or to change the texture of the transfer. If pigmented layer 18B is deposited directly on the inks of the design configuration 14, there will be bleed of inks in design 14A into pigmented layer 20A and vice versa, causing the inks to change or lose color. If drycleanability and ironability are not required, the outer resin layer 18B can be thermoplastic. Such a material can be a vinyl plastisol, such as Colonial Printing Ink Co., East Rutherford, N.J., Stretch Ink 6501A. This plastisol can be screen printed and cured at 260° F. for three minutes to form a dry tack-free thermoplastic film with excellent stretch characteristics.

Application of transfer 10 to the desired article is accomplished by heat and pressure. Application temperatures of 320° to 450° F. may be used depending on the ability of the article to withstand heat. Pressure such as that obtained from a hand flat-iron is generally adequate. For coarse surfaces, pressure up to ten (10) p.s.i.g. should be used for best results. Application times will range from one (1) to forty-five (45) seconds depending on the temperature and the type of transfer. The single resin layer transfer of FIGS. 1 and 2 typically requires fifteen (15) seconds at 385° F. The additional layer plastisol variety will typically require eight (8) seconds at 350° F. The dual resin layer transfer shown in FIG. 3 incorporating partially and substantially uncured blocked polyurethane and polyvinyl copolymer makes it possible to apply the transfers very rapidly ( in from one to three seconds as described above), which is especially important for applying labels to manufactured sheets such as stretch fabrics which are inherently porous. This is particularly useful for applying small labels to such materials.

This type of transfer has many advantages. First, it lends itself readily to transfer designs produced by high quality offset printing. If a clear resin layer must be deposited on the carrier sheet before printing to sandwich the design in conjunction with a second resin layer, this complicates offset printing. Such type of transfer is difficult to produce by offset printing because the suction created between the carrier sheet and the press blanket can readily strip the first clear layer off.

Using the vinyl-urethane system as resin layer 18 or layers 18A and 18B after the design configuration 14 has already been printed, eliminates this problem. It is not necessary to put a clear protective layer down first (which becomes the top layer after transfer has been applied) because the solvents in the vinylurethane tend to soften the lithographic inks resulting in ink migration into the resin layer without appreciably affecting the quality of the print and thus affording the extremely thin ink deposit protection from abrasion and leaching during subsequent wear and washings.

similar conditions as aforementioned layer 18. Layer 18B the print and thus affording the extremely think in de- The vinyl-urethane system does not require the use of an expensive carrier sheet such as the Mylar laminates used in polyamide transfer. Actually, the vinyl-urethane system can be used on Mylar as a carrier even though it usually has excellent adhesion to polyethylene terephthalate (Dacron or Mylar). The system must however be specially formulated so that it will not stick to the Dacron or Mylar. Quilon-coated sheets that can be printed offer an excellent release medium and are relatively inexpensive. The raw materials for the vinyl-urethane system are approximately 25% of the cost of other transfer resins, such as polyamide systems (lb. for lb., based on current market prices). No catalyst is required to cure the vinyl-urethane system as is required in some other systems, such as polyamide. If desired, a catalyst may optionally be used to accelerate cure or application time of the polyurethane system. Such a catalyst is Nuostabe V–1026 (Tenneco Chemicals). The fact that a catalyst is not required gives greater latitude in handling and storage of resin solutions of high concentrations without the possibility of gelation.

Both the single resin system transfer and the plastisol type transfer have much greater stretchability than pre-existing transfers, such as polyamide which tend to be stiff and relatively brittle. The excellent stretchability is due to the inherent elastomeric nature of the urethane and the plastisol. As a result, the single resin system transfer can give the fabric to which it is applied a good "feel" approaching that of a direct print. The plastisol version can be used on stretch garments without film breakup as it gives and returns with the fabric.

Vinyl resins which have relatively high reactivity may be utilized in the system to provide high film strength and solvent resistance. Such vinyl resins are described in the trade as VERR and VMCA. They are, for example, utilized together in equal amounts. Such resins are obtainable from the Union Carbide Corporation. The VERR type has a reactive oxirane-1 group and the VMCA has a reactive maleic group. These two types of resins co-react to form a highly cross-linked system having a greater stability than the aforementioned vinyl resins. The use of a cross-linking vinyl resin system in conjunction with a blocked polyurethane layer or layers either uncured or partially cured or a combination thereof provides applied films having an extremely high tensile strength and solvent and abrasion resistance.

Examples of transfer sheets according to this invention are produced in the following manner:

EXAMPLE I

As shown in FIGS. 1 and 2, a transparent sheet of parchment paper 10 is first coated by roller coating on one side with a coating 11 of Quilon (trademark for a stearato-chromic chloride Werner-type complex in isopropanol sold by E. I. du Pont de Nemours & Co.) to provide release properties. After drying, the coating surface 11 is then printed with a multi-colored design 14 utilizing the offset lithography process to produce a non-coherent colored design composed in part of a series of unconnected dots 16. After drying, a film forming resin 18 is placed in registry over the design by silk screening.

A typical vinyl-blocked urethane resin system is formulated as follows for screen printing:

| Constituent: | Parts by weight |
| --- | --- |
| VYHH vinyl resin | 3 |
| VMCH vinyl resin | 3 |
| Thylon D–406 urethane (70% solids) | 10 |
| Cyclohexanone (solvent) | 19 |
| Xylene (diluent) | 8 |

If desired, 0.1 part Nuostabe V–1026 can be included as a catalyst, but it is not necessary for ordinary heat and pressure application. This provides a transfer of the type shown in FIGS. 1 and 2. This transfer is applied to a piece of broadcloth 22 as shown in FIG. 4 to decorate it with a firmly bound design 24. Design 24 is so securely attached to the cloth that it does not have an apparently raised surface and lies within the pores of the fabric 22. As many as fifty repeated washings in an automatic washing machine does not damage such a design adhered to an ordinary textile fabric, such as an underwear shirt. Repeated dry-cleanings also do not dislodge the design from the cloth. This is a great improvement over pre-existing transfers applied to ordinary textile fabrics. It is even possible to apply designs to Dacron in this manner. Numerals thus can be applied to Dacron sails which previously shed other types of transfers. The firm retention of these transfers may also be due to their breathing ability. Urethane is somewhat porous and can pass air and moisture which permits passage of atmosphere through the design into and out of the cloth without pushing the design away from the cloth. Prints of this design are therefore useful for the soles of shoes where breathing ability is important as well as leaving the soles flexible.

The resin system may utilize any agent which dries the prepolymerized urethane and eliminates its tackiness. Blocked urethanes dissolved in a solvent, such as methylethylketone are advantageous. Such solutions are commonly used in urethane coatings, particularly of the one-component type. The thermosetting nature of the resin system advantageously employs a mixture of blocked isocyanates and polyols in the resin. When heat and pressure is applied to the resin, this releases the diisocyanates to form the polyurethane. Non-aqueous solutions of vinyl copolymers are particularly advantageous for combination with the urethane to eliminate its tackiness and also to impart thermoplastic properties to the film which facilitates its transfer by heat. The thermoplastic constituent is particularly important in application by hand ironing in which the available amount of heat and pressure is limited. Formulations for domestic application therefore include a greater percentage of vinyl copolymer. Formulations for application by commercial heat and pressure include about equal amounts of urethane and copolymer, whereas formulations for domestic application may be 40/60 of urethane to copolymer. For application to rubber the percentage of copolymer may be increased to provide a 30/70 proportion of urethane to copolymer.

EXAMPLE II

The transfer as shown in FIG. 3, employing layers 18A and 18B is applied (as shown in FIG. 5) to nylon stretch cloth 26A, which is more difficult to adhere. Outer layer 18B is of the same blocked polyurethane-vinyl copolymer composition and system as layer 18A but is cured to a relatively lower degree as previously described. When applied to a piece of broadcloth 22 as shown in FIG. 4 or nylon stretch cloth 26C as shown in FIG. 5, an extremely durable design is completed in a relatively short time of typically 1.5 seconds. Design 24 or 28C so applied is ultimately fully cured and is thus remarkably resistant to washing, dry cleaning and ironing. Design 28C in FIG. 5 is slightly raised from the surface of nylon stretch fabric 26C by virtue of the inherent non-wetting characteristic of the fabric and the outer resin layer. A slightly raised surface or bump 30C is therefore apparent at the transition between 28C and fabric 26C.

EXAMPLE III

A transfer is made similar to transfer 10A in FIG. 3 with the exception that outer layer 18B is completely thermoplastic, such as made from a vinyl plastisol. Such vinyl plastisols are completely thermoplastc and may be cured at 260° for three minutes to facilitate hand-ironing. Such completely thermoplastic outer layers can impart a durable design to decorate surfaces if the design covering layer 18A is substantially cured and set either before or after application to the decorated surface. The degree of such setting and migration of the design into the design covering layer affects the degree of durability of such designs. This durability is not as great as a resin system in which both layers have thermosetting properties.

I claim:

1. A dry transfer comprising a support sheet having high release properties, a colored ink design upon said support sheet, a resin film layer upon said support sheet over said design, said colored ink design being migrated within said resin film layer, and said resin film layer comprising a combination of a thermosetting blocked polyurethane with a thermoplastic vinyl polymer drying agent whereby the tackiness of said blocked polyurethane is eliminated and transfer of said colored design migrated within said resin film layer and its secure binding and curing upon a surface by application of pressure and heat are facilitated.

2. A dry transfer as set forth in claim 1 wherein said colored design utilizes low surface tension colorants.

3. A dry transfer as set forth in claim 2 wherein said colored design utilizes as FD & C color lake.

4. A dry transfer as set forth in claim 1 wherein said colored design is of a discontinuous nature.

5. A dry transfer as set forth in claim 1 wherein said colored design is a multi-color multi-lithographed design.

6. A dry transfer as set forth in claim 1 wherein said blocked polyurethane is partially cured.

7. A dry transfer as set forth in claim 1 wherein said high release support sheet comprises paper having a release coating.

8. A dry transfer as set forth in claim 1 wherein said vinyl polymer is a vinyl copolymer.

9. A dry transfer as set forth in claim 8 wherein said vinyl copolymer is a polyvinyl chloride-acetate copolymer.

10. A dry transfer as set forth in claim 8 wherein said vinyl copolymer comprises a pair of resins capable of cross linking.

11. A dry transfer as set forth in claim 10 wherein said vinyl resins essentially consist of a resin having a reactive oxirane group and a resin having a reactive maleic group.

12. A dry transfer as set forth in claim 1 wherein said resin film layer comprises a pair of resin film layers having the same composition as said resin film layer and the inner one of said pair of resin film layers being partially cured before the outer of said pair of resin film layers is applied over it.

13. A dry transfer as set forth in claim 12 wherein the outer of said pair of resin film layers is pigmented.

14. A dry transfer as set forth in claim 12 wherein said inner of said pair of resin film layers is partially cured.

15. A dry transfer as set forth in claim 12 wherein the inner of said pair of resin film layers is about from 0.1 to 0.75 mil thick and the outer of said pair of resin film layers is about from 0.1 to 0.4 mil thick.

16. A dry transfer as set forth in claim 12 wherein the outer of said pair of resin film layers is fully dried without curing said outer resin film layer.

17. A dry transfer as set forth in claim 1 wherein said resin film layer comprises a pair of resin film layers, the inner of said pair of resin film layers being substantially the same in composition as said resin film layer and the outer of said resin film layers comprising a thermoplastic resin.

18. A dry transfer as set forth in claim 17 wherein said thermoplastic resin comprises a vinyl plastisol.

19. A dry transfer as set forth in claim 17 wherein said thermoplastic resin is pigmented to provide a background for said colored design.

References Cited

UNITED STATES PATENTS

| | | | |
|---|---|---|---|
| 2,408,147 | 9/1946 | Kneale | 117—3.1 |
| 2,558,803 | 7/1951 | Wittgren | 117—3.1 |
| 2,891,876 | 6/1959 | Brown et al. | 117—161 UX |
| 3,024,216 | 3/1962 | Smitmans | 117—161 UX |
| 3,247,017 | 4/1966 | Eichler et al. | 117—161 X |
| 3,384,679 | 5/1968 | Stetz | 260—858 X |
| 3,511,732 | 5/1970 | Brookfield et al. | 117—3.4 X |

WILLIAM D. MARTIN, Primary Examiner

B. D. PIANALTO, Assistant Examiner

U.S. Cl. X.R.

117—45, 76 A, 122 H, 161 KP; 260—858

UNITED STATES PATENT OFFICE
CERTIFICATE OF CORRECTION

Patent No. 3,684,545　　　　　　Dated August 15, 1972

Inventor(s) J. D. Worrall

It is certified that error appears in the above-identified patent and that said Letters Patent are hereby corrected as shown below:

Column 1, line 40, after "sponge" insert -- , --

Column 3, line 22, change "decoated" to -- decorated --

Column 6, lines 64-65, delete both lines.

Column 9, line 9, before "FD" change "as" to -- an --

Signed and sealed this 6th day of February 1973.

(SEAL)
Attest:

EDWARD M. FLETCHER, JR.　　　　　　ROBERT GOTTSCHALK
Attesting Officer　　　　　　　　　　Commissioner of Patents